United States Patent [19]
Dent

[11] Patent Number: 5,357,454
[45] Date of Patent: Oct. 18, 1994

[54] FAST WALSH TRANSFORM PROCESSOR

[75] Inventor: Paul W. Dent, Stehag, Sweden

[73] Assignee: Ericsson GE Mobile Communications Holding, Inc., Paramus, N.J.

[21] Appl. No.: 735,805

[22] Filed: Jul. 25, 1991

[51] Int. Cl.⁵ .......................................... G06F 15/40
[52] U.S. Cl. ..................................................... 364/727
[58] Field of Search .................................. 364/725-727

[56] References Cited

U.S. PATENT DOCUMENTS

| | | |
|---|---|---|
| 3,925,646 | 12/1975 | Richardson et al. |
| 3,956,619 | 5/1976 | Mundy et al. |
| 4,601,006 | 7/1986 | Liu |
| 4,839,844 | 6/1989 | Watari .............................. 364/727 |

FOREIGN PATENT DOCUMENTS

| | | |
|---|---|---|
| 2645985 | 10/1990 | France |
| 1515122 | 4/1975 | United Kingdom |

OTHER PUBLICATIONS

Geadah et al, "Natural, Dyadic, and Sequency Order Algorithms and Processors for the Walsh-Hadamard Transform", IEEE Trans. on Computers, vol. C-26, No. 5, May 1977, pp. 435-442.

Spencer et al., "A Real Time Video Bandwidth Reduction System Based on a CCD Hadamard Transform Device", IEEE Proceedings on the National Aerospace and Electronic Conference, vol. 3, pp. 1218-1231 (May 1979).

Liu, "VLSI Computing Architectures for Haar Transform", Electronics Letters, vol. 26, No. 23, pp. 1962-1963 (Nov. 8, 1990).

"Very Low Rate Convolutional Codes for Maximum Theoretical Performance of Spread-Spectrum Multiple-Access Channels", Viterbi, IEEE Journal on Selected Areas in Communications, vol. 8, No. 4, May 1990, pp. 641-649.

Gilhousen et al., "On the Capacity of a Cellular CDMA System" IEEE Trans. on Vehicular Technology, vol. 40, pp. 303-312 (May 1991).

*Primary Examiner*—Tan V. Mai
*Attorney, Agent, or Firm*—Burns, Doane, Swecker & Mathis

[57] ABSTRACT

A processor for generating a Walsh transform by substantially simultaneously calculating M combinations of M input values, wherein $M=2^N$ and the input values are two's-complement binary values, has N stages electrically connected in sequence, wherein each stage has a criss-cross network of M conductors electrically connected in a predetermined pattern to a set of M/2 butterflies, the butterflies having devices for calculating sums and differences of respective values presented by their respective criss-cross networks and presenting the sums and differences to respective conductors of the next stage's criss-cross network. The input values are presented to the criss-cross network of the first stage serially and least-significant-bit first, and substantially synchronously therewith, the Walsh transform of the input values is serially produced by the butterflies of the N-th stage.

10 Claims, 5 Drawing Sheets

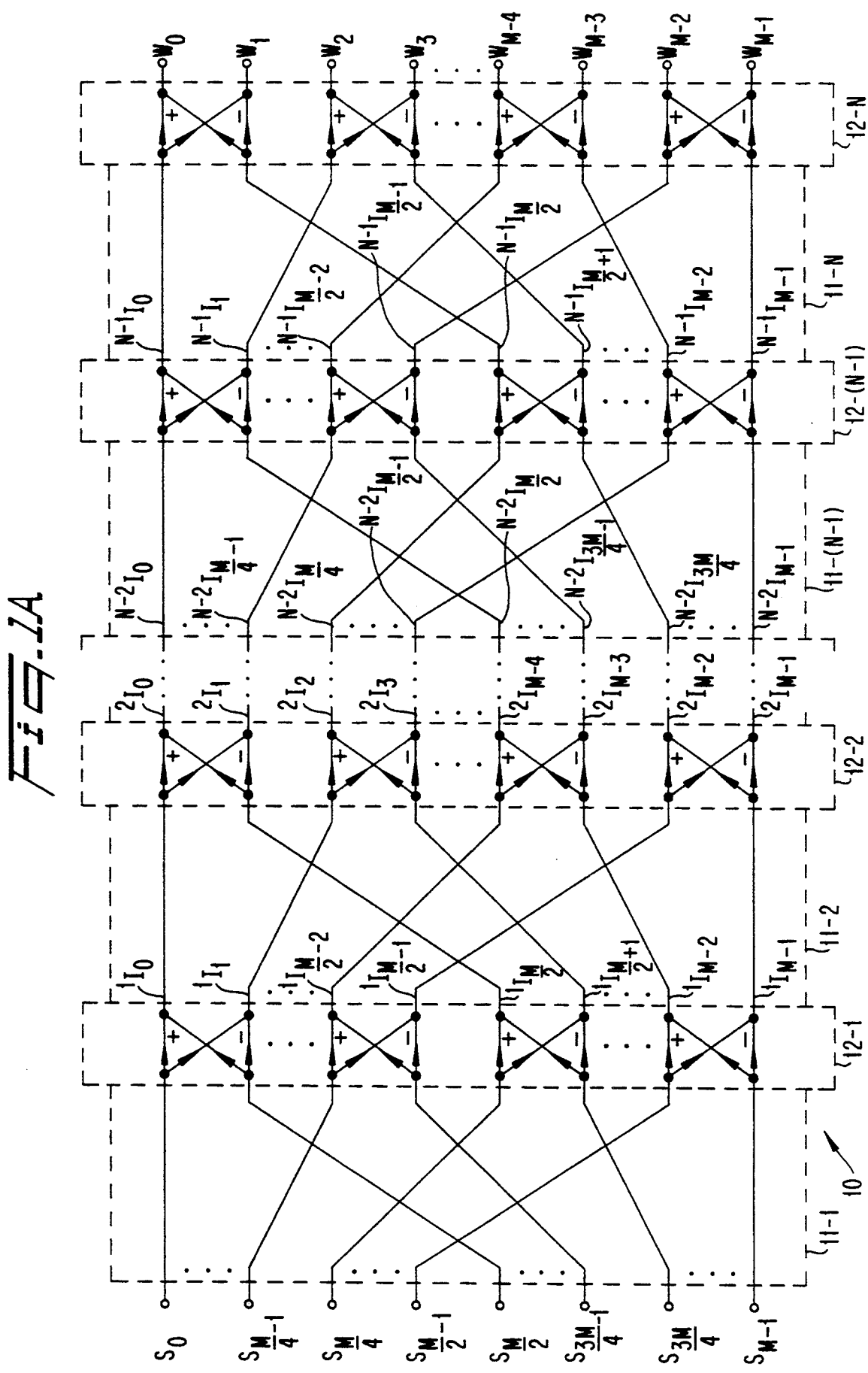

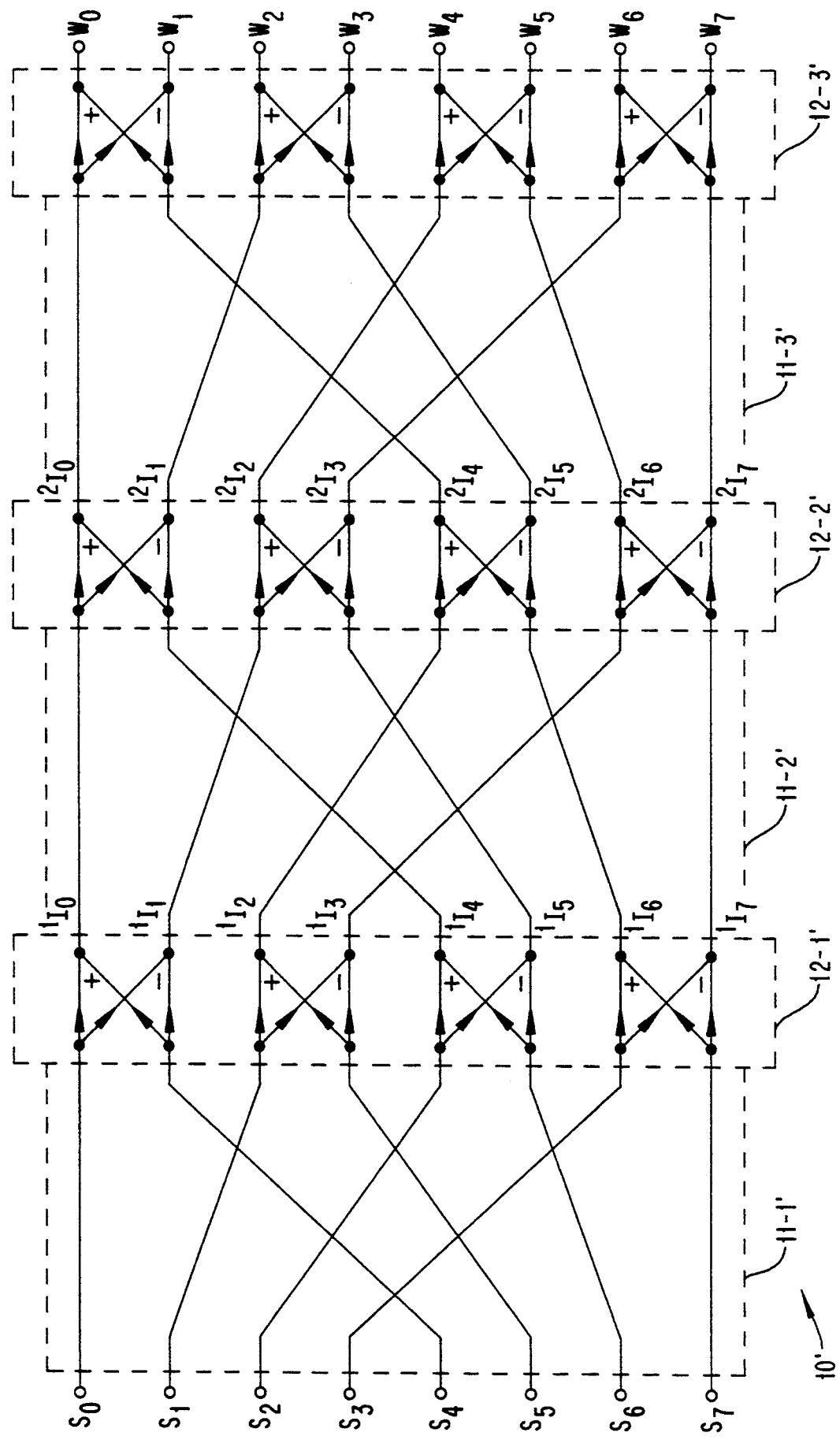

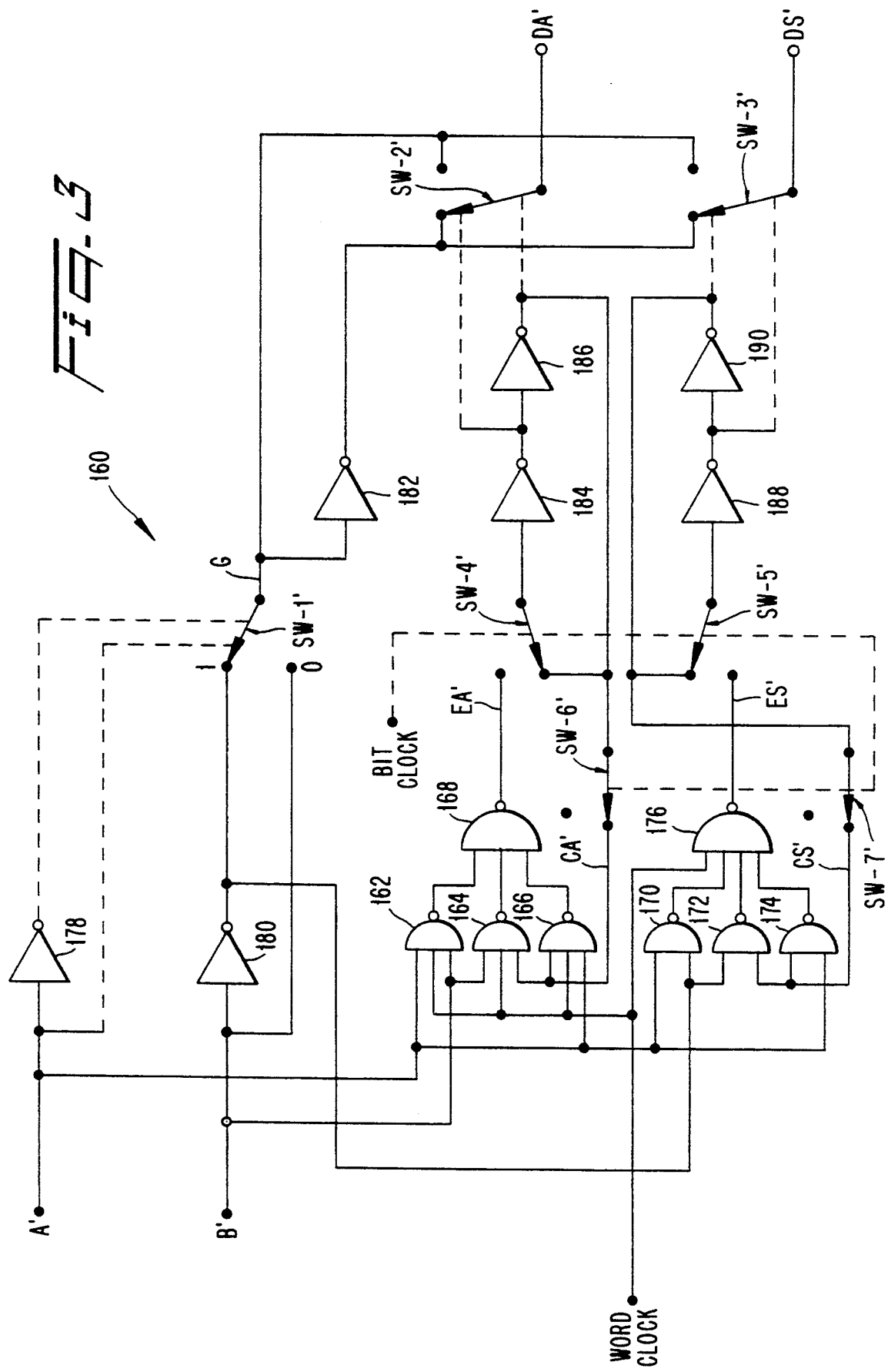

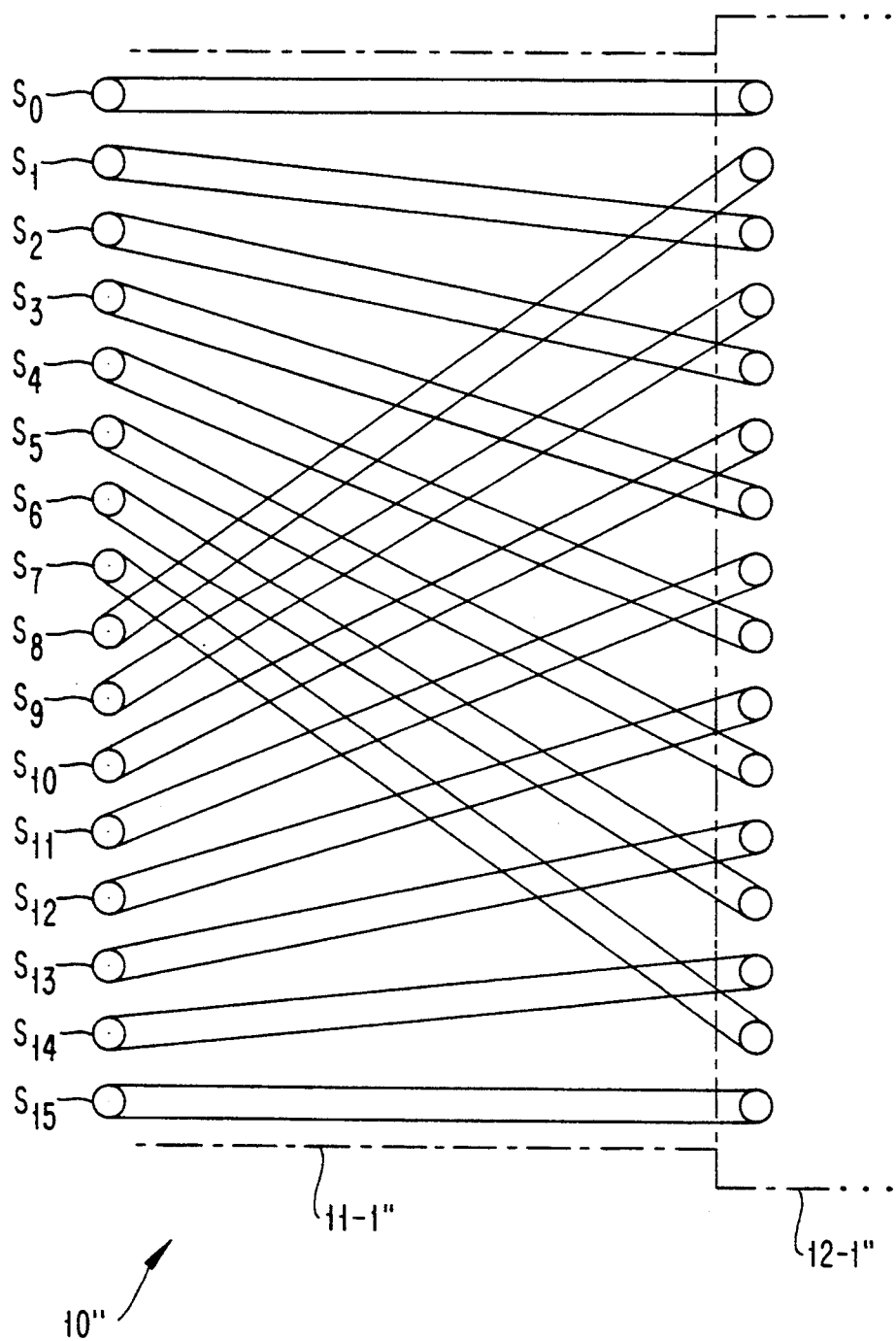

FAST WALSH TRANSFORM PROCESSOR

BACKGROUND

The present invention concerns a fully parallel implementation of a Fast Walsh Transform ("FWT") processor, for example a circuit structure on a silicon chip, for very rapidly performing large FWTs by parallel computation of all combinations simultaneously.

A Walsh transform is a mathematical operation that converts a set of $M=2^N$ numbers to another set of M numbers by adding and/or subtracting them in predetermined sets of combinations. Each set of combinations comprises, in essence, a summation of all M original numbers, but with their signs selected according to a respective predetermined pattern. M different sets of combinations can be calculated that correspond to M predetermined sign patterns that have the desirable property of being orthogonal, viz., comparing any sign pattern with any other shows like signs in exactly half the positions and unlike signs in the other half.

The mutual orthogonality of the sign patterns makes it possible to decompose the calculation of M combinations of M values into a calculation of $N \times (M/2)$ sums and $N \times (M/2)$ differences, which is a significant reduction in the number of adds and subtracts from $M^2$ to $M \times N$. An efficient structure for carrying out these combinations is described in more detail below.

The present invention is particularly useful in code division multiple access ("CDMA") communications techniques in cellular radio telephone communication systems such as the enhanced CDMA demodulation scheme based on successive signal subtractions, in signal strength order, of multiple CDMA signals that is described in Applicant's allowed co-pending U.S. patent application Ser. No. 07/628,359, filed Dec. 17, 1990. An embodiment of the present invention that processes one hundred twenty-eight, sixteen-bit serial values is particularly useful in such a system.

The capacity limits and other aspects of CDMA communication systems are discussed in Gilhousen, et al., "On the Capacity of a Cellular CDMA System", IEEE Trans. on Vehicular Technology, Vol. 40, pp. 303 312 (May 1991). As set forth in Applicant's above-cited co-pending U.S. patent application, CDMA allows communication signals from a plurality of users to overlap in both time and frequency. In principle, each informational data stream to be transmitted is impressed upon a much-higher-bit-rate data stream generated by a pseudorandom code generator. The informational data stream and the high-bit-rate data stream are combined by multiplying the two bit streams together, which is called coding, or spreading the spectrum of, the informational data stream. Each informational data stream, or channel, is allocated a unique spreading code, which for many reasons is advantageously a block-error correction code.

A plurality of coded information signals are transmitted on radio frequency carrier waves and jointly received as composite signals by receivers. Each of the coded signals overlaps all of the other coded signals, as well as noise-related signals, in both frequency and time. By correlating a received composite signal with one of the unique codes, the corresponding information signal can be isolated and decoded using the present FWT processor.

SUMMARY

The present invention provides in one embodiment a processor for generating a Walsh transform by substantially simultaneously calculating M combinations of M input values, wherein $M=2^N$ and the input values are two's-complement binary values. The processor comprises N stages electrically connected in sequence, wherein each stage comprises a criss-cross network of M conductors electrically connected in a predetermined pattern to a set of M/2 butterflies, each butterfly comprising means for calculating a sum and a difference of two respective values presented by its respective criss-cross network and presenting the sum and difference to respective conductors of the next stage's criss-cross network. The input values are presented to the criss-cross network of the first stage serially and least-significant-bit first, and substantially synchronously therewith, the Walsh transform of the input values is serially produced by the butterflies of the N-th stage.

In one aspect of the invention, the calculating means comprises a serial adder and a serial subtractor, and the serial adder includes means for storing a carry bit determined by the adder, and the serial subtractor includes means for storing a carry bit determined by the subtractor.

In another aspect of the invention, the calculating means comprises a combined serial adder/subtractor including means for storing an adder carry bit and means for storing a subtractor carry bit.

BRIEF DESCRIPTION OF THE DRAWINGS

The features and advantages of the present invention will become apparent from reading the following detailed description, in conjunction with the drawings, in which:

FIG. 1A illustrates an M-point Fast Walsh Transform;

FIG. 1B illustrates an eight-point Fast Walsh Transform;

FIG. 3 is a circuit block diagram for a combined serial adder/subtractor;

FIG. 4 illustrates a criss-cross network for a sixteen-point Fast Walsh Transform.

DETAILED DESCRIPTION

Figure 2:
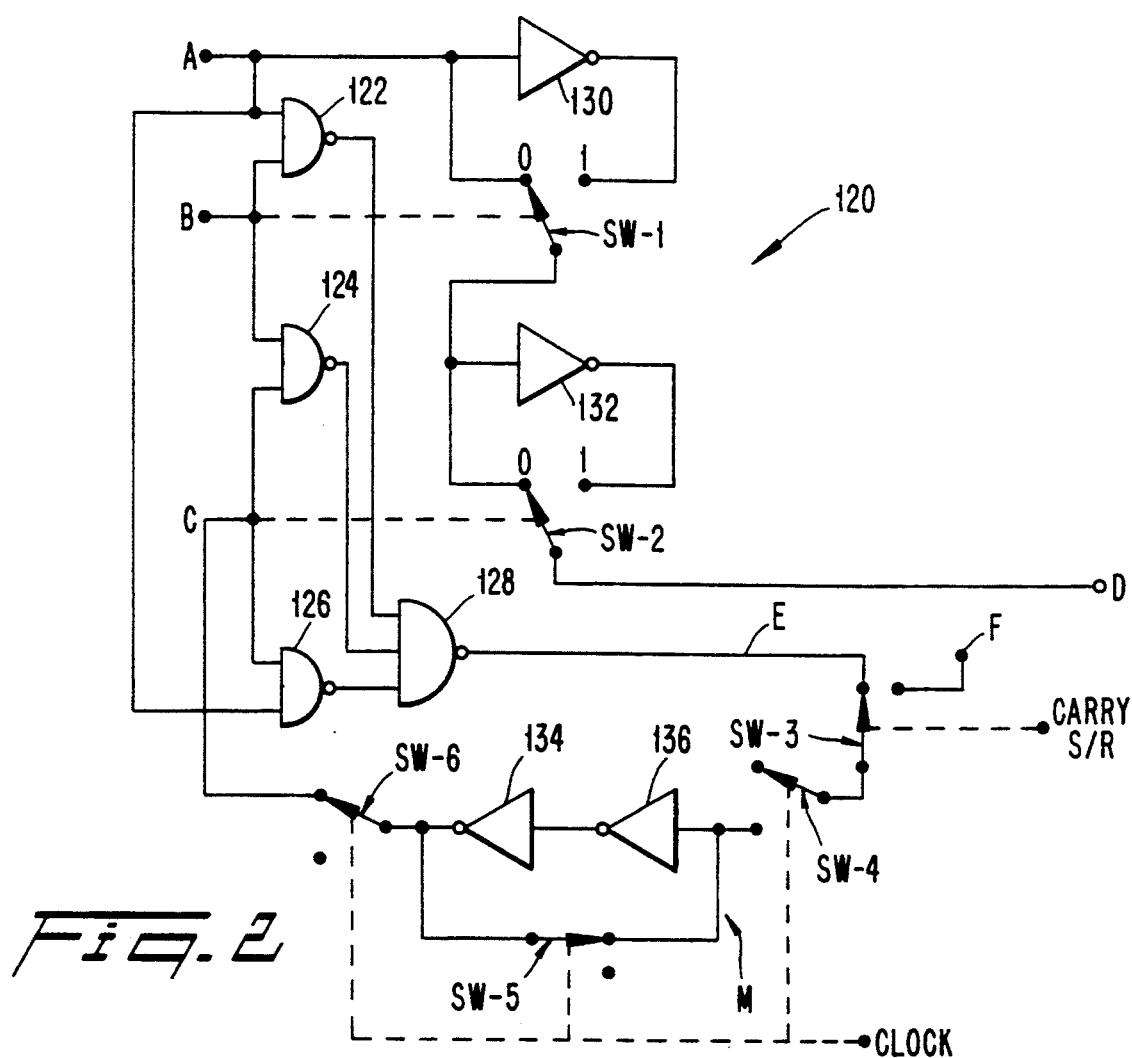
FIG. 2 is a circuit block diagram for a serial adder that may be used in carrying out a Fast Walsh Transform.

While the following description is given in a context of cellular communications systems involving portable or mobile radio telephones and/or personal communication networks, it will be understood by those skilled in the art that the present invention may be used in other applications.

Apparatus relying on the FWT and inverse FWT in a cellular communications system and pertinent considerations therefor are described in Applicant's above-cited, co-pending U.S. patent application. The present FWT processor may be advantageously used as the block decoder described in that application. As described in more detail below, an apparatus in accordance with the present invention efficiently processes M binary input values presented serially, least significant bit ("LSB") first, on M respective conductors or inputs.

As described in Applicant's above-cited, co-pending patent application, superior methods of spreading the spectrum of an information signal use error correction coding. When a single information bit is expanded by a spreading ratio R into a pseudorandom sequence of R bits, the bandwidth is spread without error-correction-coding gain; this technique may be termed "simple spreading". On the other hand, spreading a block of P information bits, where P>1, into a pseudorandom sequence of P×R bits provides error correction coding gain within the same spreading factor.

This latter technique is termed "intelligent spreading", which can involve either orthogonal or hi-orthogonal block coding of the information signal to be transmitted. In orthogonal block coding, P bits to be transmitted are converted to one of $M=2^P$ available $2^P$-bit orthogonal codewords. Sets of orthogonal codewords can be constructed as described in Applicant's above-cited U.S. patent application.

Decoding involves correlation of a received signal with all members of the set of orthogonal codewords, and the index of the codeword giving the highest correlation yields the desired information. For example, if a signal's correlation with sixteen 16-bit codewords index-numbered 0 through 15 produces the highest correlation on the tenth codeword, the desired signal information is the four-bit binary word 1010 (i.e., ten in binary). Such a code is also termed a [16,4] orthogonal block code and has a spreading ratio, R, of 16/4=4.

If the complementary codewords are also used (i.e., the codewords in which all bits are inverted), one more bit of information may be conveyed per codeword. Thus, five bits are conveyed by transmitting one of sixteen codewords and their sixteen complements, for a total of thirty-two codewords. This type of coding is known as bi-orthogonal coding. For higher spreading ratios, a [128,8] bi-orthogonal block code may be used, having a 16:1 spreading ratio. Indeed, [256,9], [512,10], ... [32768,16], ... bi-orthogonal block codes may be used.

Furthermore, a scrambling code may be added by modulo-two addition to the block code to insure that the coding is different for each signal. The scrambling code may even change randomly from block to block. It will be appreciated that modulo-two addition of a scrambling code corresponds, in a Galois field, to applying an axis rotation. The scrambling code may be descrambled at the receiver by modulo-two adding the correct scrambling code to align the axes once more with the codewords.

Significantly, an input composite signal can be efficiently correlated simultaneously with all orthogonal block codewords in a set by the FWT. In the case of a [128,7] code for example, one hundred twenty-eight input composite signal samples are transformed into a 128-point Walsh spectrum, in which each spectral point represents the value of the correlation of the composite signal with a respective codeword. The Walsh spectrum values represent the degree of correlation between the received 128-point composite signal and each of the one hundred twenty-eight orthogonal codewords. The maximal value in the Walsh spectrum identifies the proper codeword, the index of which conveys seven bits of information (orthogonal coding). If the sign can also be identified, a total of eight bits are conveyed (bi-orthogonal coding). The values of the other spectral components are due to noise and the differently scrambled signals present in the composite signal.

It will be appreciated that in real CDMA communication systems, orthogonality can be maintained only when the relative (time) alignment between sign patterns is strictly maintained; in mobile communications, such as cellular systems, time alignment can be difficult to achieve as described in Applicant's above-cited U.S. patent application. When code orthogonality cannot be guaranteed, noise-based signals may be generated, but in comparison to the originally coded signal energies, the energy of the noise signals is usually small.

Nevertheless, due to the mutual orthogonality of the sign patterns, it is possible to decompose the calculation of M combinations of M values into a calculation of $N\times(M/2)$ sums and $N\times(M/2)$ differences, which is a significant reduction from $M^2$ to $M\times N$ adds and subtracts. Such a decomposition is illustrated for a general M-point FWT by a network 10 shown in FIG. 1A. It will be appreciated that the FWT has a structure reminiscent of the Fast Fourier Transform, and both algorithms are well known.

As shown in FIG. 1A, M input values $S_0$ to $S_{M-1}$, where $M\geq 16$, are combined in pairs in a first stage comprising a first criss-cross network 11-1 and a first set 12-1 of butterflies. Each butterfly calculates the sum and difference of a respective pair of input values; as described below, pairs of serial adders and serial subtractors or combined serial adder/subtractors may be used to perform these calculations. The number of butterflies, or pairs of adders and subtractors, used in the first and each subsequent stage is M/2; for example, sixty-four pairs, or combined serial adder/subtractors, are used in each stage when M=128.

The M intermediate values $^1I_0$ to $^1I_{M-1}$ that are produced by the first stage are combined in a second stage comprising a second criss-cross network 11-2 and second set 12-2 of butterflies, both of which are advantageously identical to those in the first stage. The M intermediate values $^2I_0$ to $^2I_{M-1}$ that are produced by the second stage are combined in a third stage comprising a third criss-cross network and set of butterflies that are advantageously identical to those in the first and second stages, and so forth, until the final, N-th stage comprising an N-th criss-cross network 11-N and N-th set 12-N of butterflies. The outputs of the last stage of butterflies are the Walsh spectrum components $W_0$ to $W_{M-1}$. For one hundred twenty-eight input values, an FWT processor as illustrated would have seven stages.

It will be appreciated that the input, intermediate and output values can be identified by an arbitrary numbering convention, but the connections between the successive stages of butterfly operations are critical to the correct calculation of the FWT. Under one suitable convention such as that illustrated in FIG. 1A, inputs that have index values separated by half the total number, M, of input values are combined. As a specific example, FIG. 1B shows a FWT network for M=8, in which inputs that are four apart in index value (i.e., $S_0$ and $S_4$; $S_1$ and $S_5$; $S_2$ and $S_6$; and $S_3$ and $S_7$) are combined in the first stage of first criss-cross network 11-1' and set 12-1' of butterflies.

The results of the sum and difference calculations implemented by the first set 12-1 of butterflies, which can be designated $^1I_0$ to $^1I_{M-1}$ (for first "intermediate"), are arranged in the following order for the input to the second stage of butterflies:

$$^1I_0 = S_0 + S_{M/2}$$

$$^1I_1 = S_0 - S_{M/2}$$

$$^1I_2 = S_1 + S_{1+M/2}$$

$$^1I_3 = S_1 - S_{1+M/2}$$

$$^1I_4 = S_2 + S_{2+M/2}$$

Using this convention, the selection by the second criss-cross network of pairs of first intermediate values for combination by the second stage into second intermediate values is carried out according to exactly the same rule, i.e., first intermediate pairs separated in index value by M/2 are fed into the second stage sum/difference circuits, or butterflies. Thus, for the network shown in FIG. 1B, $^1I_0$ and $^1I_4$ are combined by second set 12-2' of butterflies into $^2I_0$ and $^2I_1$; $^1I_1$ and $^1I_5$ are combined into $^2I_2$ and $^2I_3$; $^1I_2$ and $^1I_6$ are combined into $^2I_4$ and $^2I_5$; and $^1I_3$ and $^1I_7$ are combined into $^2I_6$ and $^2I_7$. The same rule is used for the third and any subsequent stages; for the example network illustrated in FIG. 1B, the third stage comprises a third criss-cross network 11-3' and a third set 12-3' of butterflies and produces the outputs $W_0$ through $W_7$.

In accordance with one aspect of the present invention, pairs of serial add and serial subtract circuits are provided in the butterflies for calculating the necessary sums and differences, and these circuits operate on two's-complement binary values presented serially, LSB first. FIG. 2 shows a suitable serial adder 120 comprising a plurality of conventional NAND gates 122–128, inverters 130–136 and switches, which simultaneously accepts two bits presented on each of two serial inputs A, B, and a carry bit presented on a carry input C. As indicated in FIG. 2, the B input acts as a control signal for a switch SW-1 and the C input acts as a control signal for a switch SW-2. When either control signal is active (i.e., logic HIGH or "1"), the respective switch, which may advantageously be implemented by a field-effect transistor ("FET"), is thrown to the "1" position indicated in the Figure. It will be appreciated that the adder 120 advantageously outputs the one-bit sum of the inputs A, B and C on output D and a new carry bit on carry output E with substantially no delay.

The new carry bit presented on carry output E is conducted through a switch SW-3, which may be a FET actuated between each word (that may be sixteen bits long as described above) for carry bit initialization, and is stored temporarily in a memory element that may advantageously comprise a dynamic logic network M having a pair of inverters 134, 136, and a trio of switches SW-4, SW-5 and SW-6, which may also be FETs and are controlled by a suitable digital clock signal presented on a CLOCK input and synchronized to the bits presented on the inputs A, B. It will be understood that the carry memory element may also be implemented by other devices, such as a suitable latch, flip-flop or other memory cell. For signals that are fast enough, i.e., shorter than a few tens of nanoseconds, the memory network M is advantageously realized in dynamic logic, which uses the propagation delays arising from a silicon structure's inherent capacitance, to save circuit area.

The operation of the serial adder 120 proceeds as follows.

To initialize the contents of the carry memory network M, the switches SW-3 to SW-5 are thrown by the control signals CARRY S/R and CLOCK to the positions opposite to those shown in FIG. 2 just before the presentation of valid least significant bits on the inputs A, B. For a system in which input bits are presented at a thirteen megahertz (13 MHz) rate, the switches SW-3 to SW-5 (the switch SW-6 need not be actuated at this time) may be actuated within about twenty-five nanoseconds (i.e., one-third of a bit period) before the valid LSBs. As valid LSBs are presented on inputs A, B, switches SW-3 to SW-5 move back to the positions shown in FIG. 2. Thus, the initialization value on input F is loaded into the carry memory network M and presented at carry input C at the same time as the valid LSBs are presented on the inputs A, B.

After waiting a suitable period for the formation of valid sum and carry bits on outputs D, E, e.g., about fifty nanoseconds or two-thirds of a bit period, the switches SW-4 to SW-6 are actuated by the CLOCK signal to the positions opposite to those shown in FIG. 2 to load the new carry bit into the carry memory network M. Those switches are then moved back into the positions shown as the next-to-least significant bits are presented on the inputs A, B, in order to present the new carry bit on carry input C. This sequence of operations continues until the formation of valid sum and carry outputs from the most significant bits presented on the inputs A, B. In about the last third of that bit period, the CARRY S/R and CLOCK signals actuate the switches SW-3 to SW-5 to initialize the carry value as described above, thereby discarding the carry bit formed by the sum of the most significant bits. The adder is then ready for the presentation of the next input words.

It will be appreciated that the switches SW-3 to SW-6 may be actuated at slightly different times as needed to ensure proper circuit operation and yet be driven by a common timing signal generator. Such relative delays may be easily implemented by providing lossy polysilicon paths for connecting the control signals or different actuation threshold levels for the switches.

The contents of the carry memory is normally initialized to "0" at the start of a serial-add sequence, but in another aspect of the invention, the carry bit may be initialized to "1" in order to simplify the implementation of a serial subtractor as described below.

It will be appreciated that a serial subtractor for computing A−B can be formed easily using a serial adder such as that shown in FIG. 2 and suitable means for negating the values presented on input B. Thus, the serial adder would compute A+(−B). However, negating a two's-complement value involves complementing the bit pattern, for example by passing it through an inverter, and then adding one, which requires another serial adder. In some applications, the increase in complexity associated with the provision of means for negating a value may be highly disadvantageous.

Figure 2A:
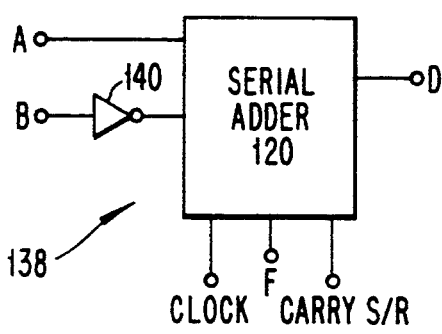
FIG. 2A is a circuit block diagram of a serial subtractor that may be used in carrying out a Fast Walsh Transform.

In accordance with another aspect of the invention, rather than negating the B input value, a serial subtractor 138 shown in FIG. 2A is provided in which the B input value is simply complemented by an inverter 140 (with the result, A+B̲, being one less than the desired A−B) and presented to a serial adder 120 in which the carry bit is initialized to ONE rather than to ZERO (compensating for the deficit) by means of the input CARRY S/R and initialization input F.

Furthermore, the architectural similarity of the adder and subtractor circuits permits their advantageous combination when both must operate on the same inputs. One such advantageous combination is a combined serial adder/subtractor network 160, which is shown in FIG. 3 and which enjoys the significant advantages of reduced circuit area and complexity.

As in the serial adder shown in FIG. 2, the combined serial adder/subtractor 160 comprises a plurality of conventional NAND gates 162–176, inverters 178–190 and switches and simultaneously accepts two bits presented on each of two serial inputs A′, B′, and carry bits for the adder and subtractor portions of the network 160 presented on carry inputs CA′ and CS′, respectively. As indicated in FIG. 3, the A′ input and its complement, $\underline{A'}$, produced by the inverter 178 act as control signals for a switch SW-1′ that connects either the B′ value or its complement, $\underline{B'}$, formed by the inverter 180 to a conductor G′. When A′ is active (i.e., logic HIGH or "1"), the switch SW-1′ is thrown to the "1" position indicated, which connects $\underline{B'}$ to the conductor G′; when $\underline{A'}$ is HIGH, the switch SW-1′ is thrown to the "0" position, which connects B′ to the conductor G′. Thus, the one-bit sum of A′ and B′ is presented on conductor G′; the sum or its complement formed by the inverter 182 is provided on an adder output terminal DA′ in accordance with the state of a dual control, two-way switch SW-2′ and on a subtractor output terminal DS′ in accordance with the state of a dual control, two-way switch SW-3′ as described in more detail below.

Figure 3A:
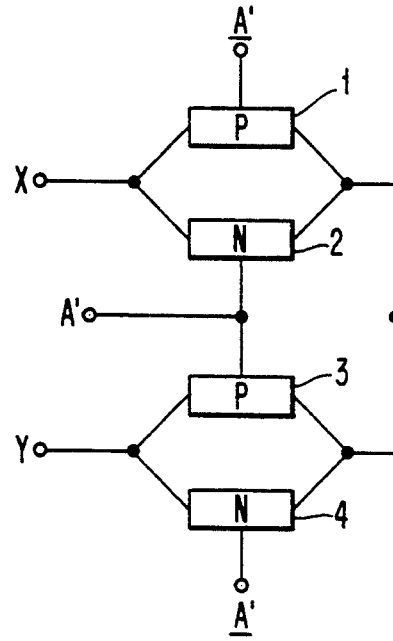
FIG. 3A is a circuit diagram for a two-way switch that may be used in the combined serial adder/subtractor.

The switches SW-1′, SW-2′ and SW-3′ are controlled by dual control signals and connect in either of two directions; for example, the switch SW-1′ connects in one direction, e.g., to the "1" position, when A′=1 and $\underline{A'}$=0, and in the other direction, e.g., to the "0" position, when A′=0 and $\underline{A'}$=1. Such switches can be advantageously fabricated in silicon by configurations of four transistors as shown in FIG. 3A. The transistors 1–4, which may be FETs, are arranged in two parallel-connected pairs of opposite type (i.e., P-type FETs 1, 3 and N-type FETs 2, 4) that are connected in parallel and controlled on their gates by the signals $\underline{A'}$ and A′, respectively. In operation, $\underline{A'}$=0 turns on P-FET 1 and turns off N-FET 4, and $\overline{A'}$=1 turns on N-FET 2 and turns off P-FET 3. Thus, FETs 1, 2 provide a low-impedance path between the terminals X and Z and a high-impedance path between the terminals Y and Z. When $\underline{A'}$=1 and A′=0, FETs 3, 4 turn on and FETs 1, 2 turn off, providing a low-impedance path between the terminals Y and Z and a high-impedance path between the terminals X and Z.

The foregoing arrangement ensures positive operation of the switches: if only one transistor type were used, whether the switch would change state, e.g., whether a transistor would turn on, would depend on the voltage levels of the control signal and the signal being switched. Of course, it will be appreciated that other components could be used to obtain overall switching behavior that is the substantially similar to that of the arrangement shown. In addition, the configuration shown in FIG. 3A can be readily used, if desired, for all the switches in the processor.

The states of the switches SW-2′, SW-3′, are determined by a carry network comprising the NAND gates 162–176, the inverters 184–190 and four switches SW-4′ to SW-7′ that are controlled by a suitable digital clock signal presented on a BIT CLOCK input in the manner described above in connection with the serial adder 120. It will be appreciated that the inverters 184, 186, act as a latch for the adder carry value like the network M in the serial adder 120 described above, and the inverters 188, 190, act as a latch for the subtractor carry value in a similar fashion.

Similarly, the switches SW-4′ to SW-7′ operate in a manner substantially similar to that described above in connection with the switches SW-4 to SW-6 in the serial adder 120, although in network 160 there is no counterpart to the switch SW-3. To initialize the contents of the carry latches, a logic LOW is presented on the WORD CLOCK input, and the switches SW-4′ to SW-7′ are thrown by the control signal BIT CLOCK to the positions opposite to those shown in FIG. 3 just before the presentation of valid least significant bits on inputs A′, B′. As valid LSBs are presented on the inputs A′, B′, the WORD CLOCK input goes HIGH (and remains HIGH during the presentation of the input words), and the switches SW-4′ to SW-7′ move back to the positions shown in FIG. 3. Thus, the WORD CLOCK input overrides the carry values produced by the gates 162–168 and 170–176, initializing the adder carry value and subtractor carry value to zero and one, respectively, and presenting those values at the carry inputs CA′, CS′ at the same time as the valid LSBs are presented on the inputs A′, B′.

After waiting a suitable period for the formation of valid sum, difference and carry bits on the outputs DA′, DS′, EA′ and ES′, switches SW-4′ to SW-7′ are actuated by the BIT CLOCK signal to the positions opposite to those shown in FIG. 3 to load the new carry bits into the carry memory networks. Those switches are then moved back into the positions shown as the next-to-least significant bits are presented on inputs A′, B′, in order to present the new carry bits on the carry inputs CA′, CS′. This sequence of operations continues until the formation of valid sum and carry outputs from the most significant bits presented on the inputs A′, B′. In about the last third of that bit period, the WORD CLOCK and BIT CLOCK signals actuate the switches SW-4′ to SW-7′ to initialize the carry value as described above, thereby discarding the carry bits formed by the sum and difference of the most significant bits. The combined adder/subtractor is then ready for the presentation of the next input words. It also will be appreciated that the switches SW-4′ to SW-7′ may be actuated at slightly different times as described above.

Using the structure illustrated in FIG. 3, the one-bit sum of A′, B′ and CA′ is produced at the output terminal DA′, and the one-bit sum of A′, B′ and CS′ is produced at the output terminal DS′, with a minimal circuit area and substantially no delay. It will be appreciated that the absence of delay avoids a need for memory between stages of the FWT processor.

Besides the pairs of add/subtract circuits or the combined adder/subtractors in the sets of butterflies, circuit implementations of the FWT may employ criss-cross wiring networks between each set of butterflies to achieve the correct value pair selection. Depending on the indexing convention for the input values that is chosen, the FWT processor will require corresponding criss-cross networks, but all such networks will be of equivalent complexity. A FWT processor using the convention illustrated in FIGS. 1A and 1B, however, can use criss-cross networks 11-1, 11-2 etc. that are identical at every stage, thereby greatly facilitating the FWT processor's fabrication on an integrated circuit by a conventional graphical step-and-repeat process.

For low power consumption and other reasons, the FWT processor is preferably fabricated in the technology known as CMOS (Complementary Metal-Oxide-Silicon); in particular, a version of CMOS technology providing at least two metallic or conductive interconnecting layers may be preferable. However, it will be understood that the FWT processor can also be constructed by other semiconductor processes suitable for the implementation of digital logic. Since such technologies are well known, they will not be described in detail here.

In CMOS, the two metallic or conductive layers may advantageously be overlapped with an intervening layer of insulating material, such as silicon dioxide or polyamide, to form the criss-cross networks that connect the sets of butterflies. FIG. 4 shows an example of a first criss-cross network 11-1'' for a 16-point FWT network 10''. The input values $S_0$ through $S_{15}$, which are presented at the left side of FIG. 4, are re-ordered or selected by the configuration of the conductors for presentation to the first set of butterflies 12-1'' as described above. The criss-cross network shown could be efficiently replicated and used for the other three criss-cross networks in the FWT processor 10''.

In the example shown, the conductors for input values $S_0$ through $S_7$ may be located in one layer and the conductors for input values $S_8$ through $S_{15}$ may be located in the second layer. It will be appreciated, however, that the geometry of the conductors need not necessarily be linear as illustrated, provided the desired re-ordering of input values is maintained, and that the main consideration in locating the conductors in the layers is avoidance of bridging. As described above, a useful number of points for a CDMA system may be one hundred twenty-eight, but so many cannot be shown clearly in a diagram.

It will be understood that the addition of two L-bit words can produce an (L+1)-bit word; therefore, steps to prevent overflow are advisable. For example, some headroom on the original input wordlength could be allowed, viz., the input wordlength could be longer than the maximal input value. An alternative step that could be taken is to drop a LSB from the calculations occasionally.

Preferred adder, subtractor and adder/subtractor circuits, such as those shown in FIGS. 2, 2A and 3, produce their output bits substantially immediately, a feature that is exploited in accordance with the invention in the following way. As seen in FIG. 1A, for example, the outputs from the first set 12-1 of butterflies are combined in the second set 12-2 of butterflies, which as described above can be an identical set of serial circuits that require the inputs to be presented LSB first. Since the LSBs required for the second stage butterflies emerge with no delay from the first stage, no intermediate register or other storage is required between the stages.

Moreover, the transformed outputs $W_0$–$W_{M-1}$ emerge serially from the final stage butterflies in step with the serially presented input values, i.e., synchronously and with substantially no delay other than that arising from the circuit elements' logic propagation delays. Thus, a complete FWT is performed in the time needed to enter serially the input values into the FWT processor and to receive the output values from the FWT processor. In the case of a 16-bit wordlength and a 16-MHz serial clocking rate, a complete transform is performed in substantially one microsecond.

In an embodiment of the present invention that is useful in the CDMA communication system described in Applicant's above-cited U.S. patent application, one hundred twenty-eight input values $S_0$ through $S_{127}$ to be transformed would enter the first stage's first criss-cross network as serial 16-bit words, LSB first. The 16-bit words would be presented in two's complement 8-bit (or at most 9-bit) format with the least significant positions occupied and all the unused most significant positions indicating the sign bit (i.e., the decimal value $-3$ is represented as 1111111111111101 rather than 0000000011111101). As described above, this formatting avoids overflow or underflow through the seven stages (since $128=2^7$) of the FWT processor.

The first criss-cross network re-orders the input values and connects them to the first set of butterflies for the first stage sum-and-difference calculations. As described above, the set of butterflies may comprise either sixty-four serial adders and sixty-four serial subtractors as shown in FIGS. 2 and 2A or sixty-four combined serial adder/subtractors as shown in FIG. 3. The resulting one hundred twenty-eight sums and differences emerge from the first set of butterflies as the first intermediate serial 16-bit words $^1I_0$ through $^1I_{127}$ and are connected to the second stage's second criss-cross network that is identical in form to the first criss-cross network.

The re-ordered outputs from the second criss-cross network are applied to the inputs of the second set of butterflies, which are identical in form to the first set, for the second stage sum-and-difference calculations. The resulting one hundred twenty-eight sums and differences emerge as the second intermediate serial 16-bit words $^2I_0$ through $^2I_{127}$ and are connected to the third stage's third criss-cross network that is identical in form to the first and second criss-cross networks, and so forth for a total of seven stages to complete the transform, which is output as spectral components $W_0$ through $W_{127}$.

It is, of course, possible to embody the invention in specific forms other than those described above without departing from the spirit of the invention. The embodiments described above are merely illustrative and should not be considered restrictive in any way. The scope of the invention is given by the appended claims, rather than the preceding description, and all variations and equivalents which fall within the range of the claims are intended to be embraced therein.

I claim:

1. A processor for generating a Walsh transform by substantially simultaneously calculating M combinations of M input values, wherein $M=2^N$, N is a positive integer, and the input values are two's-complement binary values, comprising:

N stages electrically connected in sequence, wherein each stage comprises a criss-cross network of M conductors electrically connected in a predetermined pattern to a set of M/2 butterflies, each butterfly comprising means for calculating a sum and a difference of two respective values presented by each butterfly's respective criss-cross network and presenting the sum and difference to respective conductors of the next stage's criss-cross network, wherein the input values are presented to a criss-cross network of a first stage bit-serially and least-significant-bit first, and substantially synchronously therewith, the Walsh transform of the input values is bit-serially produced least significant bit first by butterflies of an N-th stage.

2. The processor of claim 1, wherein each criss-cross network comprises M conductors overlappingly disposed in a pattern in at least two conductive layers disposed on a semiconductive substrate, the conductive layers being separated by an insulating layer.

3. The processor of claim 2, wherein the patterns of at least two of the criss-cross networks are substantially identical.

4. The processor of claim 1, wherein the calculating means comprises a serial adder and a serial subtractor, and the serial adder includes means for storing a carry bit determined by the adder, and the serial subtractor includes means for storing a carry bit determined by the subtractor.

5. The processor of claim 4, wherein each carry bit storing means comprises a dynamic logic network comprising a first switch for selectively connecting the determined carry bit to a first inverter, a second inverter serially and selectively connected to the first inverter by a second switch, and a third switch for selectively connecting the second inverter to a carry input of the carry bit storing means's respective serial adder or serial subtractor, wherein the switches are actuated substantially synchronously with the presentation of bits to said respective serial adder or serial subtractor.

6. The processor of claim 4, wherein each of the serial adder and serial subtractor includes means for initializing the respective carry bits to predetermined values.

7. The processor of claim 6, wherein the serial subtractor comprises a second serial adder and means for inverting a predetermined one of the two respective values presented by the subtractor's respective criss-cross network.

8. The processor of claim 1, wherein the calculating means comprises a combined serial adder/subtractor including means for storing an adder carry bit and means for storing a subtractor carry bit.

9. The processor of claim 8, wherein each carry bit storing means comprises a dynamic logic network comprising a first switch for selectively connecting the respective carry bit to a first inverter, a second inverter serially connected to the first inverter, and a second switch for selectively connecting the second inverter to a respective carry input, wherein the switches are actuated substantially synchronously with the presentation of bits to the carry bit storing means's respective combined serial adder/subtractor.

10. The processor of claim 8, wherein the combined serial adder/subtractor includes means for initializing the adder carry bit to a first predetermined value and means for initializing the subtractor carry bit to a second predetermined value.

* * * * *